Apr. 17, 1923.
J. W. CLOUD
FEED VALVE DEVICE
Filed Aug. 16, 1922
1,452,068
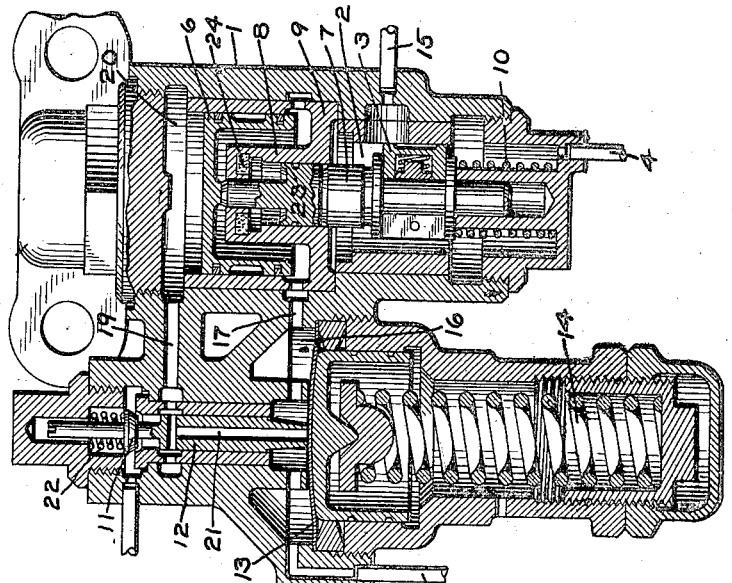
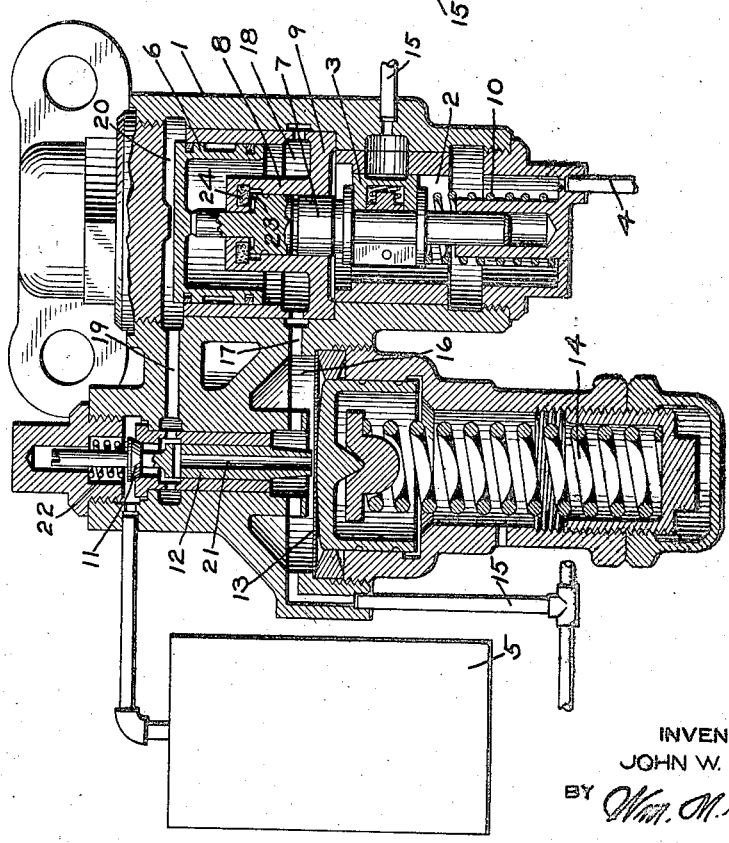
INVENTOR
JOHN W. CLOUD
BY *Wm. M. Cady*
ATTORNEY Patented Apr. 17, 1923.

1,452,068

UNITED STATES PATENT OFFICE.

JOHN WILLS CLOUD, OF LONDON, ENGLAND, ASSIGNOR TO THE WESTINGHOUSE AIR BRAKE COMPANY, OF WILMERDING, PENNSYLVANIA, A CORPORATION OF PENNSYLVANIA.

FEED-VALVE DEVICE.

Application filed August 16, 1922. Serial No. 582,263.

*To all whom it may concern:*

Be it known that I, JOHN W. CLOUD, a subject of the King of Great Britain, and resident of London, England, have invented a certain new and useful Improvement in Feed-Valve Devices, of which the following is a specification.

This invention relates to feed valve devices more particularly adapted for maintaining the fluid pressure in fluid pressure brake systems.

The feed valve device commonly employed comprises a main valve and piston operated by fluid under pressure for supplying fluid from the main reservoir to the brake pipe, a pilot valve for varying the fluid pressure on the piston, and a movable abutment subject to the opposing pressures of the main reservoir and an adjustable spring for controlling the pilot valve.

The principal object of my invention is to provide an improved feed valve device of the above character.

In the accompanying drawing; Fig. 1 is a central sectional view of a feed valve device embodying my invention and showing the feed valve in the closed position; and Fig. 2 a similar view of the feed valve device, showing the parts in the open or feeding position.

As shown in the drawing, the feed valve device may comprise a casing 1 having a valve chamber 2 connected by pipe 4 to main reservoir 5 and containing a slide valve 3. The slide valve 3 is operated by a piston 6 through a stem 7 which is guided in a bushing 8 formed in the partition 9. The valve 3 thus tends to be maintained in its closed position by main reservoir pressure in the valve chamber 2 acting on the valve stem 7 and assisted by spring 10.

For controlling the fluid pressure on the piston 6 a pilot valve mechanism is provided comprising a pilot valve 11 having a stem 12 and a movable diaphragm 13, subject on one side to the pressure of an adjustable spring 14 and on the opposite side to the pressure in the usual train brake pipe 15.

The diaphragm chamber 16 is connected by a passage 17 with chamber 18 at one side of the piston 6 and the pilot valve 11 controls communication from the main reservoir 5 through passage 19 to chamber 20 at the other side of piston 6 and the stem 12 is provided with a passage 21 adapted under certain conditions to establish communication from chamber 16 to passage 19.

In operation, when the pressure in the brake pipe 15 is at its normal pressure, the diaphragm 13 will be maintained in the position shown in Fig. 1 in which the diaphragm is out of engagement with the end of the valve stem 12. This permits the light spring 22 to maintain the pilot valve 11 in its closed position and at the same time communication is established from diaphragm chamber 16, through passage 21 and passage 19 to piston chamber 20.

The fluid pressures on opposite sides of piston 6 are thus equalized at brake pipe pressure, permitting the main reservoir pressure acting on the stem 7 with the pressure of spring 10 to maintain the slide valve 3 in its closed position. In this position, possible leakage past the stem 7 from valve chamber 2 to chamber 18 is prevented by the engagement of an annular rib 23 on the stem 7 with a seat ring 24.

If the brake pipe pressure falls below the predetermined standard degree of pressure, the diaphragm 13 will be operated by the spring 14, so that the end of the stem 12 is engaged and the pilot valve 11 lifted from its seat. Fluid from the main reservoir 5 is then supplied through passage 19 to piston chamber 20 and the piston 6 is moved thereby to the position shown in Fig. 2, in which the slide valve 3 is opened, so that fluid is supplied from valve chamber 2 and the main reservoir to the brake pipe 15. The diaphragm 13 engaging the end of the stem 12, cuts off communication through the passage 21, so that fluid at main reservoir pressure is prevented from passing to the diaphragm chamber 16.

The slide valve 3 is maintained in its open position until the brake pipe pressure has been increased to the standard degree, when the diaphragm 13 will be operated by the increased brake pipe pressure to permit the pilot valve 11 to seat and to permit the equalization of fluid pressures on opposite sides of the piston 6 through the open port 21 in the stem 12.

With the above feed valve construction it will be seen that the operation of the main valve and piston is effected by the positive supply of fluid under pressure to one side of the piston.

Having now described my invention, what I claim as new and desire to secure by Letters Patent, is:—

1. A feed valve device comprising a main valve, a piston for operating said valve, and a pilot valve for supplying fluid under pressure to one side of said piston in one position, said pilot valve having means for effecting the equalization of fluid pressures on opposite sides of said piston in another position.

2. The combination with a main reservoir and a brake pipe, of a feed valve device comprising a main valve, a piston normally subject on opposite sides to brake pipe pressure and on a restricted area to main reservoir pressure for operating said valve, a pilot valve for supplying fluid at main reservoir pressure to one side of said piston, and a movable diaphragm subject to the opposing pressures of the brake pipe and a spring for operating said pilot valve.

3. A feed valve device comprising a main valve, a piston for operating said valve, a pilot valve for controlling the supply of fluid under pressure to one side of said piston and having a valve stem provided with a passage through which fluid pressures on opposite sides of the piston may be equalized, and a diaphragm for operating said pilot valve and adapted to control communication through the passage in said stem.

In testimony whereof I have hereunto set my hand.

JOHN WILLS CLOUD.